United States Patent
Chow (10) Patent No.: US 10,737,557 B2
(45) Date of Patent: Aug. 11, 2020

(54) DYNAMIC SHADING SYSTEMS

(71) Applicant: Toyota Motor Engineering & Manufacturing North America, Inc., Plano, TX (US)

(72) Inventor: Justin Chow, Ann Arbor, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 0 days.

(21) Appl. No.: 16/025,501

(22) Filed: Jul. 2, 2018

(65) Prior Publication Data

US 2020/0001687 A1    Jan. 2, 2020

(51) Int. Cl.
 B60J 3/02   (2006.01)
 B60Q 1/50   (2006.01)
 B60Q 1/52   (2006.01)

(52) U.S. Cl.
 CPC ............ *B60J 3/0204* (2013.01); *B60Q 1/503* (2013.01); *B60Q 1/52* (2013.01)

(58) Field of Classification Search
 None
 See application file for complete search history.

(56) References Cited

U.S. PATENT DOCUMENTS

| | | | |
|---|---|---|---|
| 6,300,870 B1 | 10/2001 | Nelson | |
| 6,580,472 B1 | 6/2003 | Willingham et al. | |
| 6,666,493 B1 | 12/2003 | Naik | |
| 7,659,808 B1 | 2/2010 | Cooper et al. | |
| 7,791,785 B2 * | 9/2010 | Knafou | B60J 3/04 348/817 |
| 10,163,349 B1 * | 12/2018 | Desai | G08G 1/162 |
| 2010/0065721 A1 * | 3/2010 | Broude | B60J 3/04 250/201.1 |
| 2010/0094501 A1 * | 4/2010 | Kwok | G02B 27/01 701/36 |
| 2010/0276962 A1 | 11/2010 | Zhang et al. | |
| 2015/0077826 A1 | 3/2015 | Beckman | |
| 2015/0261219 A1 | 9/2015 | Cuddihy et al. | |

(Continued)

FOREIGN PATENT DOCUMENTS

| | | |
|---|---|---|
| GB | 2475870 A | 6/2011 |
| KR | 20150088448 A | 8/2015 |
| WO | 2014124592 A1 | 8/2014 |

OTHER PUBLICATIONS thisiswhyimbroke.com, "Driving message display"; online catalog; 2018.

(Continued)

*Primary Examiner* — Tamara L Weber
(74) *Attorney, Agent, or Firm* — Dinsmore & Shohl LLP (57) ABSTRACT

In some embodiments, a dynamic shading system of a vehicle includes one or more occupant sensors, a window configured for dynamic shading, and a control unit communicatively coupled to the one or more occupant sensors and the window. The one or more occupant sensors are configured to output a signal indicative of a position of each of one or more occupants within the vehicle. The control unit executes logic to shade areas of the window based on the position of each of the one or more occupants in order to shade each of the one or more occupants in accordance with a shade preference of each of the one or more occupants.

22 Claims, 3 Drawing Sheets

(56) References Cited

U.S. PATENT DOCUMENTS

2015/0273989 A1   10/2015  Momot
2018/0037164 A1\*  2/2018  Newman ................. G02F 1/153
2018/0079284 A1   3/2018  Choi et al.
2019/0383091 A1\*  12/2019  Wilson ....................... B60J 3/04

OTHER PUBLICATIONS

Research Frontiers Inc., "SPD—Smart Glass. Electronically Tintable Glass", 2018.
Extended European Search Report pertaining to EP Application No. 19183907 dated Nov. 26, 2019.

\* cited by examiner

DYNAMIC SHADING SYSTEMS

TECHNICAL FIELD

The present specification generally relates to shading systems and, more specifically, dynamic shading systems for vehicles for dynamically shading vehicle occupants.

BACKGROUND

Modern windows may be configured to tint on demand by varying the polarity of molecules embedded in the window. These modern windows may be able to be programmed to activate at a certain time of day. For example, the windows may be darkened during daytime hours and lightened during the night. For example, during the daytime, the window may become gradually more opaque as the sun gets brighter. However, such windows are limited in that they may not be able to dynamically change based on a user's position or preference of shading.

Accordingly, a need exists for alternative shading systems for dynamically shading vehicle occupants.

SUMMARY

In one embodiment, a dynamic shading system of a vehicle includes one or more occupant sensors, a window configured for dynamic shading, and a control unit communicatively coupled to the one or more occupant sensors and the window. The one or more occupant sensors are configured to output a signal indicative of a position of each of one or more occupants within the vehicle. The control unit executes logic to shade areas of the window based on the position of each of the one or more occupants in order to shade each of the one or more occupants in accordance with a shade preference of each of the one or more occupants.

In another embodiment, a dynamic shading system includes a window configured for dynamic shading, a user input device, and a control unit communicatively coupled to the window and the user input device. The control unit executes logic to adjust the dynamic shading of the window to display a message received from the user input device.

In yet another embodiment, a dynamic shading system of a vehicle includes one or more occupant sensors, a window configured for dynamic shading, a user input device, and a control unit communicatively coupled to the one or more occupant sensors, the window, and the user input device. The one or more occupant sensors are configured to output a signal indicative of a position of each of one or more occupants within the vehicle. The control unit executes logic to shade areas of the window based on at least one of the position of each of the one or more occupants in order to shade each of the one or more occupants in accordance with a shade preference of each of the one or more occupants and a message received from the user input device.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Referring generally to the figures, the present disclosure is directed to a dynamic shading system for a vehicle. In particular, dynamic shading systems according to the present disclosure include a window that is configured for dynamic shading and a control unit that executes logic to control the shading of the window. For example, in some embodiments, the dynamic shading system includes one or more occupant sensors that are configured to output a signal indicative of a position of each of one or more occupants within the vehicle. The dynamic shading system may adjust the shading based on a position of each occupant of the vehicle in order to shade each occupant in accordance with a shade preference of each occupant. That is, the shading of each occupant is adjusted to that occupant's preferences. Accordingly, if one occupant would like to be shaded and another does not, the dynamic shading system can adjust the shading of the window such that only the occupant desiring shade is shaded. In further embodiments, the dynamic shading system may include a user input device that allows a user to input a word and/or symbol and the control unit may adjust the dynamic shading of the window to display the user's word and/or symbol. These and other features will be described in more detail herein.

Figure 1:
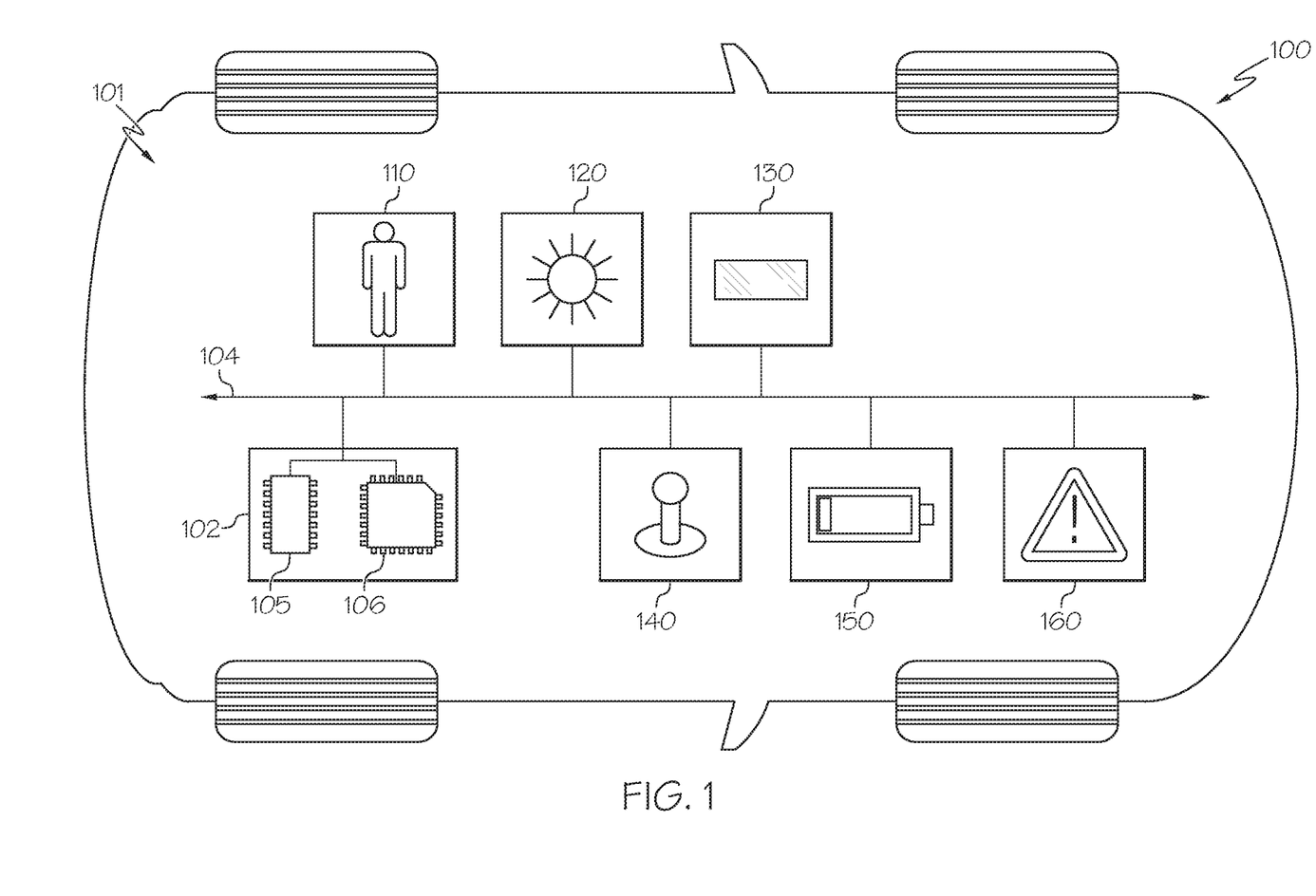
FIG. 1 schematically depicts a dynamic shading system of a vehicle, according to one or more embodiments shown and described herein.

Referring now to FIG. 1, a vehicle 100 is schematically illustrated. The vehicle 100 includes a dynamic shading system 101. It is noted that while the vehicle 100 is generally depicted as an automobile, the vehicle 100 may be any passenger vehicle such as, for example, a terrestrial, aquatic, and/or airborne vehicle. In some embodiments, the vehicle 100 may be an electric or hybrid vehicle. As will be described in greater detail herein, the dynamic shading system 101 causes the dynamic shading of a window 130 of the vehicle 100 to adjust in at least one of position, size, orientation color, opacity, word, symbol, and the like.

The dynamic shading system 101 generally includes a control unit 102, a communication path 104, and a window 130 configured for dynamic shading. The dynamic shading system 101 may further include one or more occupant sensors 110, one or more light sensors 120, a user input device 140, a battery sensor 150, and an emergency system 160. It is noted that dynamic shading systems 101 according to the present disclosure may include fewer or greater number of modules communicatively coupled to one another over the communication path 104 without departing from the scope of the present disclosure.

As described above, the dynamic shading system 101 includes a communication path 104 that provides data interconnectivity between various modules disposed within the dynamic shading system 101. Specifically, each of the modules can operate as a node that may send and/or receive data. In some embodiments, the communication path 104 includes a conductive material that permits the transmission of electrical data signals to processors, memories, sensors, and actuators throughout the dynamic shading system 101. In another embodiment, the communication path 104 can be a bus, such as for example a LIN bus, a CAN bus, a VAN bus, and the like. In further embodiments, the communication path 104 may be wireless and/or an optical waveguide. Components that are communicatively coupled may include components capable of exchanging data signals with one another such as, for example, electrical signals via conductive medium, electromagnetic signals via air, optical signals via optical waveguides, and the like.

The control unit 102 includes one or more processors 105 communicatively coupled with one or more memory modules 106. The one or more processors 105 may include any device capable of executing machine-readable instructions stored on a non-transitory computer-readable medium. Accordingly, each processor may include a controller, an integrated circuit, a microchip, a computer, and/or any other computing device.

The one or more memory modules 106 are communicatively coupled to the one or more processors 105 over the communication path 104. The one or more memory modules 106 may be configured as volatile and/or nonvolatile memory and, as such, may include random access memory (including SRAM, DRAM, and/or other types of RAM), flash memory, secure digital (SD) memory, registers, compact discs (CD), digital versatile discs (DVD), and/or other types of non-transitory computer-readable mediums. Depending on the particular embodiment, these non-transitory computer-readable mediums may reside within the dynamic shading system 101 and/or external to the dynamic shading system 101. The one or more memory modules 106 may be configured to store one or more pieces of logic, as described in more detail below. The embodiments described herein may utilize a distributed computing arrangement to perform any portion of the logic described herein.

Embodiments of the present disclosure include logic that includes machine-readable instructions and/or an algorithm written in any programming language of any generation (e.g., 1GL, 2GL, 3GL, 4GL, and/or 5GL) such as, machine language that may be directly executed by the processor, assembly language, object-oriented programming (OOP), scripting languages, microcode, etc., that may be compiled or assembled into machine readable instructions and stored on a machine readable medium. Similarly, the logic and/or algorithm may be written in a hardware description language (HDL), such as logic implemented via either a field-programmable gate array (FPGA) configuration or an application-specific integrated circuit (ASIC), and their equivalents. Accordingly, the logic may be implemented in any conventional computer programming language, as pre-programmed hardware elements, and/or as a combination of hardware and software components. The logic stored on the one or more memory modules 106, when executed by the one or more processors 105 causes the dynamic shading of the window 130 to change according to at least one of a location of a vehicle occupant, a stored preference of the occupant, and by input from an occupant received on a user input device 140.

The dynamic shading system 101 generally includes a window 130 configured for dynamic shading communicatively coupled to the control unit 102 over the communication path 104. It is noted that though the present disclosure often refers to windows in the context of a vehicle 100, it is contemplated that the dynamic shading system 101 as described herein may be applicable to other implementation contexts including, but not limited to, house windows, business windows, and the like. In the context of the vehicle 100, the window 130 may include any window 130 of the vehicle 100. For example, the window 130 may include a front windshield, a passenger side window, a driver side window, a rear windshield of the vehicle 100, or any combination thereof. For example, in some embodiments, each of the windows of the vehicle 100 may be configured with dynamic shading.

The window 130 being configured for dynamic shading refers to portions of the window 130 becoming selectively darkened (e.g., having increased opacity) in response to some input. Accordingly, the window 130 may be formed from any medium capable of transitioning between various states of light transmissivity in response to a control signal from the control unit 102. For example, one light transmissivity state may be a transparent state. Further, a second light transmissivity state may be an opaque state where light incident on the window 130 in the transparent state is greater than the light that is transmitted through the window 130 in the opaque state. For example, the light transmissivity of the window 130 may be varied from 0% (i.e., completely opaque) to 100% (i.e., completely transparent) or any percentage there between.

As non-limiting examples, the window 130 may be made from a smart glass whose light transmission properties are altered when voltage, light, or heat is applied. Smart glass technologies include, but are not limited to, electrochromic, photochromic, thermochromic, suspended-particle, micro-blind, liquid crystal, and polymer-dispersed liquid-crystal devices. In some embodiments, the window 130 may include pixels which are responsive to electrical excitation. For example, the control unit 102 may control the pixels within the window 130 to adjust the opacity of the window 130. In some embodiments, the control unit 102 may execute logic to aggregate black pixels to selectively shade regions of the window 130. In some embodiments, the window 130 may include molecules which are responsive to electrical excitation. That is the electric current may adjust the polarity and/or position of the selected molecules to cause the molecules to reflect light in a way the effects the opacity of the window 130. For example, addition or removal of an electric current can excite the molecules and cause the window 130 to become more or less opaque. In some embodiments, heat, such that applied by the hand of a user, may cause the window's 130 opacity properties to be altered. It is contemplated that the dynamic shading may be configured to change color. For example, in some embodiments, the level of excitation may also be configured to adjust the color of the dynamic shading.

As will be described in greater detail herein, the control unit 102 may execute logic stored on the one or more memory modules 106 to control an excitation path to selectively adjust the dynamic shading of the window 130. For example, the dynamic shading of the window 130 may allow for selected portions of the window 130 to become shaded based on the position of the one or more occupants in the vehicle 100 in order to shade each of the one or more occupants in accordance with a shade preference of each of the one or more occupants. For example, and as shown in FIGS. 2A-2D the control unit 102 can control the dynamic shading of the window 130 to only shade particular occupants, or portions thereof, by adjusting the level of visible light transmission (opacity) of the window 130. In some embodiments, the control unit 102 may execute logic to adjust the dynamic shading of the window to display a message. Examples are illustrated in FIGS. 3A-3D the control unit 102 can adjust the excitation path to display a message including, for example, symbols, words, images, or the like in the window 130 with the dynamic shading.

Referring again to FIG. 1, the dynamic shading system 101 may further include the one or more occupant sensors 110. The one or more occupant sensors 110 may include any sensor(s) capable of outputting a position signal indicative of a position of each of the one or more occupants within the vehicle 100 and/or a recognition signal indicative of an identity of each of the one or more occupants of the vehicle 100. In some embodiments, the one or more occupant sensors 110 may include dedicated sensors capable of outputting a position signal indicative of a position of each of the one or more occupants within the vehicle 100 and dedicated sensors capable of outputting a recognition signal indicative of an identity of each of the one or more occupants of the vehicle 100. In some embodiments, a single sensor may be capable of outputting both a position signal indicative of a position of an occupant within the vehicle 100 and a recognition signal indicative of an identity of the occupant of the vehicle 100. It is noted that use of the term "each of the one or more occupants" may in some embodiments only refer to occupants positioned within a driver seat and a front passenger seat. In other embodiments "each of the one or more occupants" may include each occupant regardless of seated position within the vehicle 100.

Sensors capable of outputting a position signal indicative of a position of each of the one or more occupants may include, but are not limited to, cameras, seat sensors, seat belt sensors, proximity sensors, and or any combination thereof. Based on the position signal output by the one or more occupant sensors 110, the dynamic shading system 101, through logic executed by the control unit 102, may determine a position of each of the one or more occupants within the vehicle 100. In some embodiments, based on the position signal output by the one or more occupant sensors 110, a location of particular features of an occupant can be determined (e.g., hands, hair, face, arms, etc.). The control unit 102 may execute logic to shade areas of the window 130 based on the position of each of the one or more occupants in order to shade each of the one or more occupants in accordance with a shade preference associated with each of the one or more occupants. Such shade preference may be based on a user input or may be a stored preference saved to the one or more memory modules 106 by the particular occupant. In some embodiments, the control unit 102 may execute logic to monitor the position of each of the one or more occupants with the one or more occupant sensors 110 and adjust a position of the dynamic shading of the window 130 based on a movement of the one or more occupants.

In some embodiments, the occupant position signal output by the one or more occupant sensors 110 may cause the one or more processors 105 to execute logic to cause the one or more occupant sensors 110 to output the occupant recognition signal to allow the one or more processors 105 to identify various occupants within the vehicle 100. As such, detecting a vehicle occupant within the vehicle 100 may start a process of identifying the one or more occupants and identifying shade preferences associated with the one or more occupants. Upon recognizing the one or more vehicle 100 occupants, the dynamic shading system 101 may adjust the dynamic shading of the window 130 in accordance with the shade preference stored for the particular occupant. A shade preference may include, but is not limited to, at least one of a body region shade preference (e.g., hands, arms, face, hair, etc.), a shade opacity preference, a shade color preference, and the like.

In some embodiments, to aid in recognizing a particular vehicle occupant 112A, the one or more occupant sensors 110 may include fingerprint sensors, facial recognition sensors (e.g., cameras), or the like. For example, a fingerprint sensor may scan a fingerprint of a vehicle occupant 112A and, based on fingerprint data stored in the one or more memory modules 106 of the system 101, the control unit 102 may execute logic to match the scanned fingerprint with a matching fingerprint of a known user of the vehicle 100. Facial recognition sensors may be any device having an array of sensing devices (e.g., pixels) capable of detecting radiation in an ultraviolet wavelength band, a visible light wavelength band, and/or an infrared wavelength band. The occupant recognition signal output by the facial recognition sensors may include image data indicative of the facial features of a vehicle occupant. The control unit 102 may execute logic to process the image data to match the facial features from the image data with a particular vehicle occupant of the vehicle 100 to identify that particular occupant. The one or more occupant sensors 110 may be located anywhere within the vehicle 100 to gather information relating to positioning and/or recognition of the one or more occupants of the vehicle 100. For example, occupant sensors 110 may be located in the dashboard, in the steering wheel, in the seats, in the ceiling, etc.

As noted herein above, the dynamic shading system 101 may further include the one or more light sensors 120. The one or more light sensors 120 may include any sensor(s) capable of outputting a light signal indicative of the position of a point of light. For example, the one or more light sensors 120 may include photoresistors, photodiodes, phototransistors, cameras, and the like. The dynamic shading system 101 may track a point of light relative to the occupant of the vehicle to dynamically shade the occupant from the point of light. For example, when a vehicle is sitting in traffic and there is a focus of sunlight off of a mirror into the user's eye(s), the control unit 102 may execute logic to determine, based on the light signal from the one or more light sensors 120, that a point of light is incident on an occupant and dynamically shade the occupant from that point of light. In some embodiments, the control unit 102 may monitor a position of the point of light and adjust a position of the dynamic shading of the window 130 based on a movement of the point of light.

In some embodiments, the one or more light sensors 120 may be configured to output a sun signal indicative of the position of the sun. In such embodiments, the one or more light sensors 120 may include vehicle location sensors (e.g., GPS signals providing geo-coordinate location of the vehicle 100), which may be used, in conjunction with the time of the day, to determine the position of the sun, Based on the position of the sun, the control unit 102 may execute logic to determine the location of the sun relative to each of the one or more occupants within the vehicle 100 and, accordingly, determine if there is or is likely to be sunlight incident on a particular vehicle occupant.

In some embodiments, using the one or more light sensors 120, the control unit 102 may execute logic to monitor the position of the sun with the one or more light sensors 120 and adjust a position of the dynamic shading of the window 130 based on a movement of the sun. In some embodiments, the control unit 102 may also, as described above, monitor the position of each of the one or more occupants with the one or more occupant sensors 110. The control unit 102 may at the same time monitor the position of the sun or a point of light relative to the position of each of the one or more occupants with the one or more light sensors 120 and adjust a position of the dynamic shading of the window 130 based on a movement of at least one of the one or more occupants and a movement of the sun or the point of light relative the position of each of the one or more occupants.

In some embodiments, the one or more light sensors 120, may output a signal indicative of the brightness of the environment of the vehicle 100. For example, if the brightness of an environment of the vehicle 100 is less than a predetermined threshold, the control unit 102 may reframe from activating the dynamic shading of the window 130 to shade one or more of the vehicle 100 occupants. For example, when a vehicle 100 is parked in a covered garage, is being used at night, or is in some other shaded environment, dynamic shading may not be needed or desired.

In some embodiments, the one or more light sensors 120 may include sensors directed toward the one or more occupants that output a signal indicative of light being incident on the user. For example, the one or more light sensors 120 may include cameras and the control unit 102 may execute logic to process the images captured by the camera to determine a level of lighting that the occupant is subjected to. The control unit 102 may utilize a rating scale to rate the level of exposure of the occupant (or portions of the occupant) to determine if the occupants (or portions thereof) are shaded already or may be in need of shading. If the occupant, or portions thereof, is determined to have a level of light exposure above a predetermined threshold, the control unit 102 may activate the dynamic shading system 101 to dynamically shade the occupant according to the shade preference of the occupant.

To control/input a shade preference of an occupant of the vehicle 100, the vehicle 100 may include the user input device 140. The user input device 140 may be communicatively coupled over the communication path 104 to the other modules of the dynamic shading system 101. The user input device 140 may be any device capable of transforming mechanical, optical, or electrical signals into a data signal capable of being transmitted with the communication path 104. Specifically, the user input device 140 may include any number of movable objects that transform physical motion into a data signal that can be transmitted over the communication path 104 such as, for example, a button, a switch, a knob, a microphone, a keyboard, a touchscreen, or the like. In some embodiments, the user input device 140 may be a personal smart device such as a smartphone, tablet, laptop, or the like communicatively coupled to other modules of the dynamic shading system 101 through near-field wireless communication or the like.

In some embodiments, the user input device 140 may include the window 130, itself. For example, a user may touch the windshield at a location, as determined by the control unit 102 based on a signal from the one or more occupant sensors 110, and that portion of the windshield may become shaded. So as to filter inadvertent contacts of the user with the windshield, a time that the user is in contact with the windshield may be monitored by the control unit 102 using the one or more occupant sensors 110, such that contact with the windshield by the user above a predetermined time is indicative of a user input into the dynamic shading system 101. For example, contact of greater than two seconds, may be indicative of a user input and an intention of the user to adjust the dynamic shading to a preference of the user.

Using the user input device 140, an occupant may enter into the control unit 102 various shade preferences such as, for example, shade color preferences, shade position preferences, body part shading preferences, opacity shading preferences, or the like. Examples are illustrated in FIGS. 2A-2D. As will be described in greater detail herein, in some embodiments, the user input device 140 may allow a user to input a message including, for example, symbols, words, images, or the like into the user input device 140, wherein the control unit 102 may execute logic to display the input of the user with the dynamic shading of the window 130, examples are illustrated in FIGS. 3A-3D.

Figure 2A:
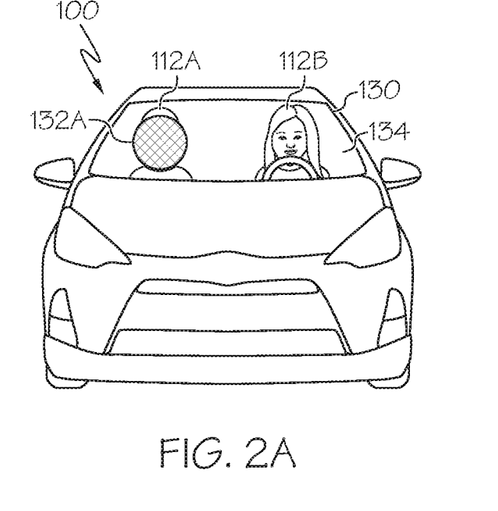
FIG. 2A illustrates a shading preference output produced by the dynamic shading system of FIG. 1, according to one or more embodiments shown and described herein.
Figure 2B:
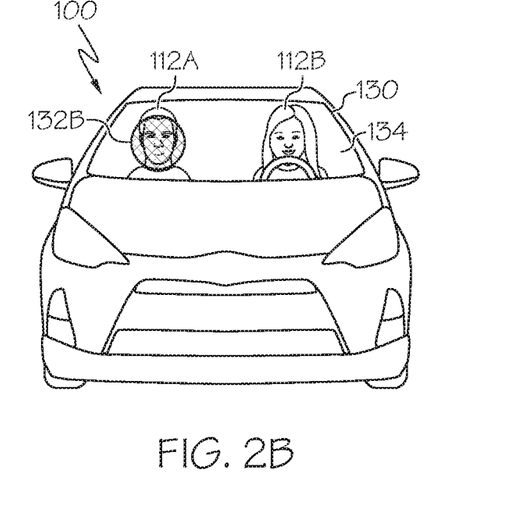
FIG. 2B illustrates a shading preference output produced by the dynamic shading system of FIG. 1, according to one or more embodiments shown and described herein.

Referring now to FIGS. 2A-2D various non-limiting example implementations of the dynamic shading of the window 130 are illustrated. Each of FIGS. 2A-2D illustrate the vehicle 100 having a first occupant 112A and a second occupant 112B positioned within a passenger compartment 134 of the vehicle 100. In FIG. 2A the first vehicle occupant 112A is provided with dynamic shading 132A while the second occupant 112B is not. As described above, this may be due to several reasons. For example, the first vehicle occupant's 112A shade preference may indicate that the first vehicle occupant 112A desired shading while the shade preferences of the second vehicle occupant 112B indicate that the second vehicle occupant 112B did not desire shading. Alternatively, the control unit 102 may have determined, based on the light signal from the one or more light sensors 120, that there is sun-light or a point of light incident on the first vehicle occupant 112A and not on the second vehicle occupant 112B, such that the control unit 102 adjusts the dynamic shading 132A to only shade the first vehicle occupant 112A. Referring to FIG. 2B, the positioning of the dynamic shading 132B over the first vehicle occupant 112A is the same, but in this instance, the user preference settings of the first vehicle occupant 112A causes the control unit 102 to adjust the opacity of the dynamic shading 132B. As illustrated, the dynamic shading 132A illustrated in FIG. 2A is more opaque than the dynamic shading 132B illustrated in FIG. 2B.

Figure 2C:
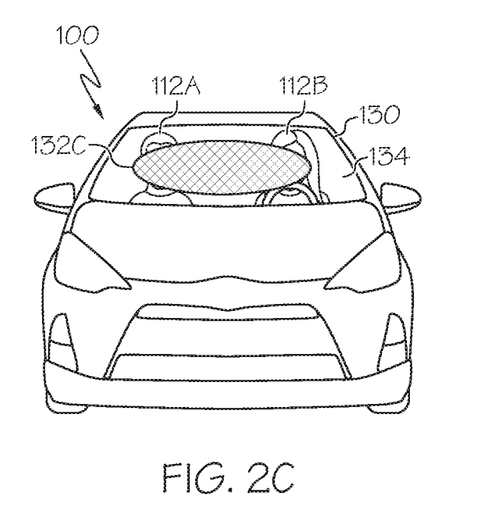
FIG. 2C illustrates a shading preference output produced by the dynamic shading system of FIG. 1, according to one or more embodiments shown and described herein.
Figure 2D:
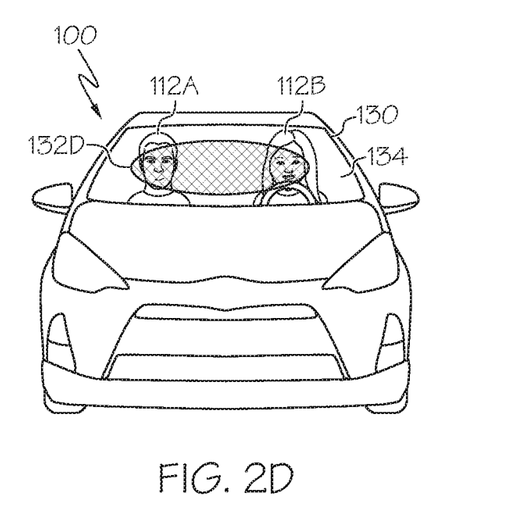
FIG. 2D illustrates a shading preference output produced by the dynamic shading system of FIG. 1, according to one or more embodiments shown and described herein.

FIGS. 2C and 2D illustrate similar opacity differences in dynamic shading 132C and 132D than that shown in FIGS. 2A and 2B. However, in this case, both the first vehicle occupant 112A and the second vehicle occupant 112B have the same shade preference, such that the dynamic shading 132C/132D shades both users simultaneously. Various combinations of shade preferences however are achievable by the dynamic shading system 101. For example, each vehicle occupant 112A and 112B may adjust, for example, not only the opacity, but the color, body portions shaded (e.g. hair, arms, face, etc.), and the like. As noted above, in some embodiments, the dynamic shading (e.g., 132A, 132B, 132C, and/or 132D) may be adjusted based on a position of the user and/or a position of the sun or other source of light relative to the user.

Figures 3A, 3B:
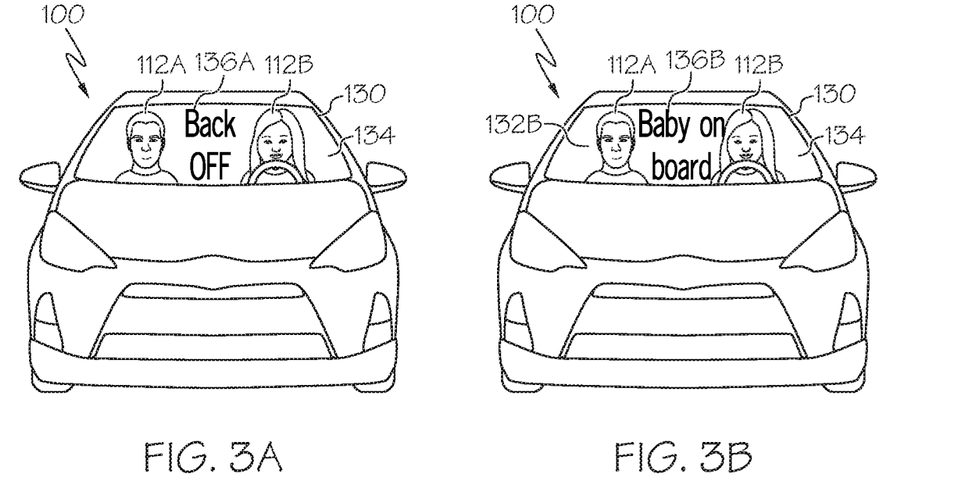
FIG. 3A illustrates a shading preference output produced by the dynamic shading system of FIG. 1, according to one or more embodiments shown and described herein.
FIG. 3B illustrates a shading preference output produced by the dynamic shading system of FIG. 1, according to one or more embodiments shown and described herein.
Figures 3C, 3D:
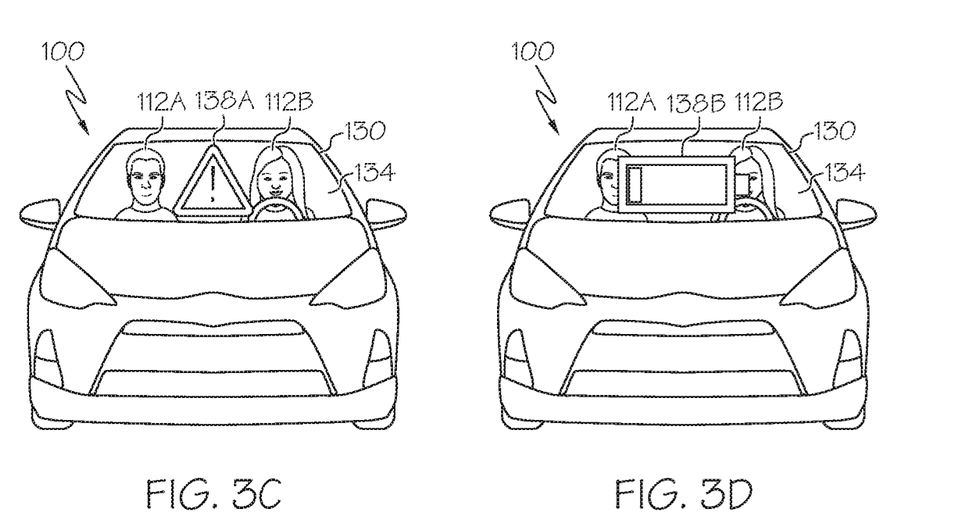
FIG. 3C illustrates a shading preference output produced by the dynamic shading system of FIG. 1, according to one or more embodiments shown and described herein.
FIG. 3D illustrates a shading preference output produced by the dynamic shading system of FIG. 1, according to one or more embodiments shown and described herein.

As noted above, in some embodiments, the user input device 140 may allow a user to input a message including one of a symbol, text, image or the like into the user input device 140, wherein the control unit 102 may execute logic to display the input of the user with the dynamic shading of the window 130. A characteristic such as, for example, the size, orientation, shade opacity, and shade color of the message may be adjustable based on an input within the user input device 140. Referring now to FIGS. 3A-3D in conjunction with FIG. 1, the vehicle 100 is illustrated as including the first vehicle occupant 112A and the second vehicle occupant 112B within the passenger compartment 134 of the vehicle 100. In FIG. 3A, one of the occupants may have used a user input device 140 to enter in text "Back Off." The control unit 102, based on this user input, adjusts the dynamic shading 136A to show the text "Back Off." Similarly, in FIG. 3B the control unit 102, based on a user input, has adjusted the dynamic shading 136B to read "Baby on Board." Such text may be selected by the user from an available menu or may be entered by a user using a keyboard, microphone, touchscreen, or the like. It is noted that the text shown in FIGS. 3A and 3B are not limiting and only illustrate possible example texts that may be input by a user. FIGS. 3C and 3D illustrate the dynamic shading 138A, 138B configured to show a symbol (e.g., emergency symbol and low battery symbol, respectively).

In some embodiments, the dynamic shading may be adjusted to show advertisements. The advertisements may be paired to the dynamic shading system 101 through communication (e.g., wireless communication) from a remote device or server. For example, advertisements may be stored or downloaded from a remote server or a user's device (e.g., smart phone, tablet, etc.), using for example network interface hardware. In embodiments, the dynamic shading may show images such as, but not limited to, symbols, emojis, hand drawings (entered on a touch screen device, such as mobile phone, for example), and the like. In some embodiments, the user may input a drawing into the dynamic shading system 101 with, for example, a tablet or smartphone. A characteristic of the message is adjustable based on a user input on the user input device 140. The display of the message may allow occupants of the vehicle 100 to communicate with others outside of the vehicle 100.

In some embodiments, the user input device 140 may allow a user to control the dynamic shading of the vehicle 100 based on a preference to obstruct a view of those outside of the vehicle 100 into particular points of the vehicle 100. For example, a parent or caregiver may control the dynamic shading of the vehicle 100 to obstruct a view of a child such as through the passenger windows.

The dynamic shading system 101 may, in some embodiments, include an emergency system 160 communicatively coupled to the control unit 102 over the communication path 104. The emergency system 160 may include various modules that output signals indicative of possible emergency situations. Emergency situations may include, but are not limited to, mechanical failure, impending mechanical failure (e.g., engine overheating, low oil, etc.), an impact to the vehicle 100, or a user input on the user input device 140 indicating an emergency situation. In such embodiments, the emergency system 160 may be configured to output an emergency output signal indicative of the emergency situation. Referring also to FIG. 3C, the control unit 102 may then execute logic to determine that an emergency situation is occurring based on the emergency output signal of the emergency system 160 and automatically adjust the dynamic shading 138A of the window 130 to display an emergency signal with the dynamic shading 138A of the window 130. FIG. 3C illustrates a possible implementation for displaying the emergency signal with the dynamic shading. In other embodiments, other symbols indicative of an emergency are contemplated, for example the word "HELP!" might be displayed.

As noted above, the dynamic shading system 101 may further include battery sensor 150. The battery sensor 150 may be communicatively coupled to control unit 102 of the dynamic shading system 101 over the communication path 104. The battery sensor 150 may be operatively coupled to the battery (not shown) of the vehicle 100 and configured to output a charge level signal indicative of a charge level of the battery of the vehicle 100. For example, hybrid and/or electric vehicle 100 may rely on a battery to provide power for moving the vehicle 100. In some embodiments, the control unit 102 may execute logic to determine the charge level of the battery based on the charge level signal output by the battery sensor 150 and automatically adjust the dynamic shading of the window 130 to display a low battery signal, illustrated in FIG. 3D, with the dynamic shading of the window 130 when the control unit 102 determines that the charge level signal is less than a predetermined charge level. For example, less than 50% charge level, less than 40% charge level, less than 30% charge level, less than 20% charge level, less than 10% charge level, or the like may cause the control unit 102 to execute logic to automatically display a low battery signal with the dynamic shading of the window 130. The automatic display of emergency or low battery symbols may allow others (e.g., emergency responders/good Samaritans) to quickly assess the situation to help the occupants of the vehicle 100.

It should now be understood the embodiments described herein are directed to dynamic shading systems for vehicles. In particular, dynamic shading systems according to the present disclosure include a window that is configured for dynamic shading and a control unit that executes logic to control the shading of the window based on a shading preference of the various occupants within the vehicle. Accordingly, vehicle occupants may control the dynamic shading according to their own preferences. This may allow an occupant to better control their internal temperatures of the vehicle by blocking incoming light. In further embodiments, the dynamic shading system may include a user input device that allows a user to input a message (e.g., word and/or symbol) and the control unit may adjust the dynamic shading of the window to display the user's message. Accordingly, a vehicle occupant may easily communicate to those outside of the vehicle.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A dynamic shading system of a vehicle comprising:
one or more occupant sensors configured to output a signal indicative of a position of each of one or more occupants within the vehicle;
a window configured for dynamic shading; and
a control unit communicatively coupled to the one or more occupant sensors and the window, wherein the control unit executes logic to shade areas of the window based on the position of each of the one or more occupants in order to shade each of the one or more occupants in accordance with a shade preference of each of the one or more occupants, wherein the shade preference includes a body region shade preference.

2. The dynamic shading system of claim 1 further comprising a user input device communicatively coupled to the control unit, wherein each of the one or more occupants may input to the control unit the shade preference associated with each of the one or more occupants.

3. The dynamic shading system of claim 1, wherein the control unit executes logic to:
monitor the position of each of the one or more occupants with the one or more occupant sensors; and
adjust a position of a dynamic shading of the window based on a movement of the one or more occupants.

4. The dynamic shading system of claim 1, comprising one or more light sensors communicatively coupled to the control unit and configured to output a light signal indicative of a position of a point of light.

5. The dynamic shading system of claim 4, wherein the control unit executes logic to:
monitor the position of the point of light with the one or more light sensors; and
adjust a position of a dynamic shading of the window based on a movement of the point of light.

6. The dynamic shading system of claim 1, further comprising one or more light sensors communicatively coupled to the control unit and configured to output a sun signal indicative of a position of a sun relative, wherein the control unit executes logic to:
monitor the position of each of the one or more occupants with the one or more occupant sensors;
monitor the position of the sun relative to the position of each of the one or more occupants with the one or more light sensors; and
adjust a position of a dynamic shading of the window based on a movement the one or more occupants and a movement of the sun relative the position of each of the one or more occupants.

7. The dynamic shading system of claim 1, wherein the shade preference of each of the one or more occupants additionally includes at least one of a shade opacity preference and a shade color preference.

8. The dynamic shading system of claim 1, wherein:
the one or more occupant sensors automatically output an occupant recognition signal; and
the control unit:
receives the occupant recognition signal;
automatically identifies the one or more occupants in response to receiving the occupant recognition signal; and
automatically retrieves shade preferences associated with the one or more occupants stored on one or more memory modules in response to identifying the one or more occupants.

9. The dynamic shading system of claim 1, wherein the body region shade preference includes at least a hand shade preference, an arm shade preference, or a hair shade preference, wherein the control unit determines a location of a hand, an arm, or hair of the one or more occupants based on the body region shade preference of each of the one or more occupants.

10. A dynamic shading system comprising:
a window configured for dynamic shading;
one or more occupant sensors configured to output a signal indicative of a vehicle occupant touching the window at a location; and
a control unit communicatively coupled to the window and the one or more occupant sensors, wherein the control unit executes logic to:
detect, based on the signal output by the one or more occupant sensors, that a user has touched the window;
determine a time period the user is in contact with the window; and
shade a location of the window contacted by the vehicle occupant in response to the time period being above a predetermined threshold.

11. The dynamic shading system of claim 10, wherein the control unit executes logic to adjust the dynamic shading of the window to display a message received from a user input device, and wherein a characteristic of the message is adjustable based on a user input on the user input device.

12. The dynamic shading system of claim 11, wherein the characteristic includes at least one of a shade color and a shade opacity.

13. The dynamic shading system of claim 10, wherein:
the window is a window of a vehicle;
the control unit is communicatively coupled to an emergency system of the vehicle that is configured to output an emergency output signal indicative of an emergency situation; and
the control unit executes logic to:
determine that an emergency situation is occurring based on the emergency output signal of the emergency system; and
automatically adjust the dynamic shading of the window to display an emergency signal with the dynamic shading of the window, when the control unit has determined that an emergency situation is occurring.

14. The dynamic shading system of claim 10, wherein:
the window is a window of a vehicle;
the control unit is communicatively coupled to a battery sensor, configured to output a charge level signal indicative of a charge level of a battery of the vehicle, and
the control unit executes logic to:
determine the charge level of the battery based on the charge level signal output by the battery sensor; and
automatically adjust the dynamic shading of the window to display a low battery signal with the dynamic shading of the window when the control unit determines that the charge level signal is less than a predetermined charge level.

15. A dynamic shading system of a vehicle comprising:
one or more occupant sensors configured to output a signal indicative of a position of each of one or more occupants within the vehicle;
a window configured for dynamic shading;
a user input device; and
a control unit communicatively coupled to the window, the one or more occupant sensors, and the user input device, wherein the control unit executes logic to shade areas of the window based on at least one of the position of each of the one or more occupants in order to shade each of the one or more occupants in accordance with a shade preference of each of the one or more occupants and a message received from the user input device, wherein the shade preference includes a body region shade preference.

16. The dynamic shading system of claim 15, wherein the control unit executes logic to:
monitor the position of each of the one or more occupants with the one or more occupant sensors; and
adjust a position of a dynamic shading of the window based on a movement of the one or more occupants.

17. The dynamic shading system of claim 15, comprising one or more light sensors communicatively coupled to the control unit and configured to output a sun signal indicative of a position of a point of light.

18. The dynamic shading system of claim 17, wherein the control unit executes logic to:
monitor the position of the point of light with the one or more light sensors; and
adjust a position of a dynamic shading of the window based on a movement of the point of light.

19. The dynamic shading system of claim 15, further comprising one or more light sensors communicatively coupled to the control unit and configured to output a sun signal indicative of a position of a sun relative to each of the one or more occupants, wherein the control unit executes logic to:
monitor the position of each of the one or more occupants with the one or more occupant sensors;
monitor the position of the sun relative to each of the one or more occupants with the one or more light sensors; and
adjust a position of a dynamic shading of the window based on a movement the one or more occupants and a movement of the sun relative to the window.

20. The dynamic shading system of claim 15, wherein the shade preference of each of the one or more occupants additionally includes at least one of a shade opacity preference and a shade color preference.

21. The dynamic shading system of claim 15, wherein:
the control unit is communicatively coupled to an emergency system of the vehicle that is configured to output an emergency output signal indicative of an emergency situation; and
the control unit executes logic to:
determine that an emergency situation is occurring based on the emergency output signal of the emergency system; and
automatically adjust the dynamic shading of the window to display an emergency signal with the dynamic shading of the window, when the control unit has determined that an emergency situation is occurring.

22. The dynamic shading system of claim 15, wherein:
the control unit is communicatively coupled to a battery sensor, configured to output a charge level signal indicative of a charge level of a battery of the vehicle, and
the control unit executes logic to:
determine the charge level of the battery based on the charge level signal output by the battery sensor; and
automatically adjust the dynamic shading of the window to display a low battery signal with the dynamic shading of the window when the control unit determines that the charge level signal is less than a predetermined charge level.

* * * * *